(No Model.)          2 Sheets—Sheet 1.
C. E. SEYMOUR.
ORE CONCENTRATOR.
No. 503,687.          Patented Aug. 22, 1893.
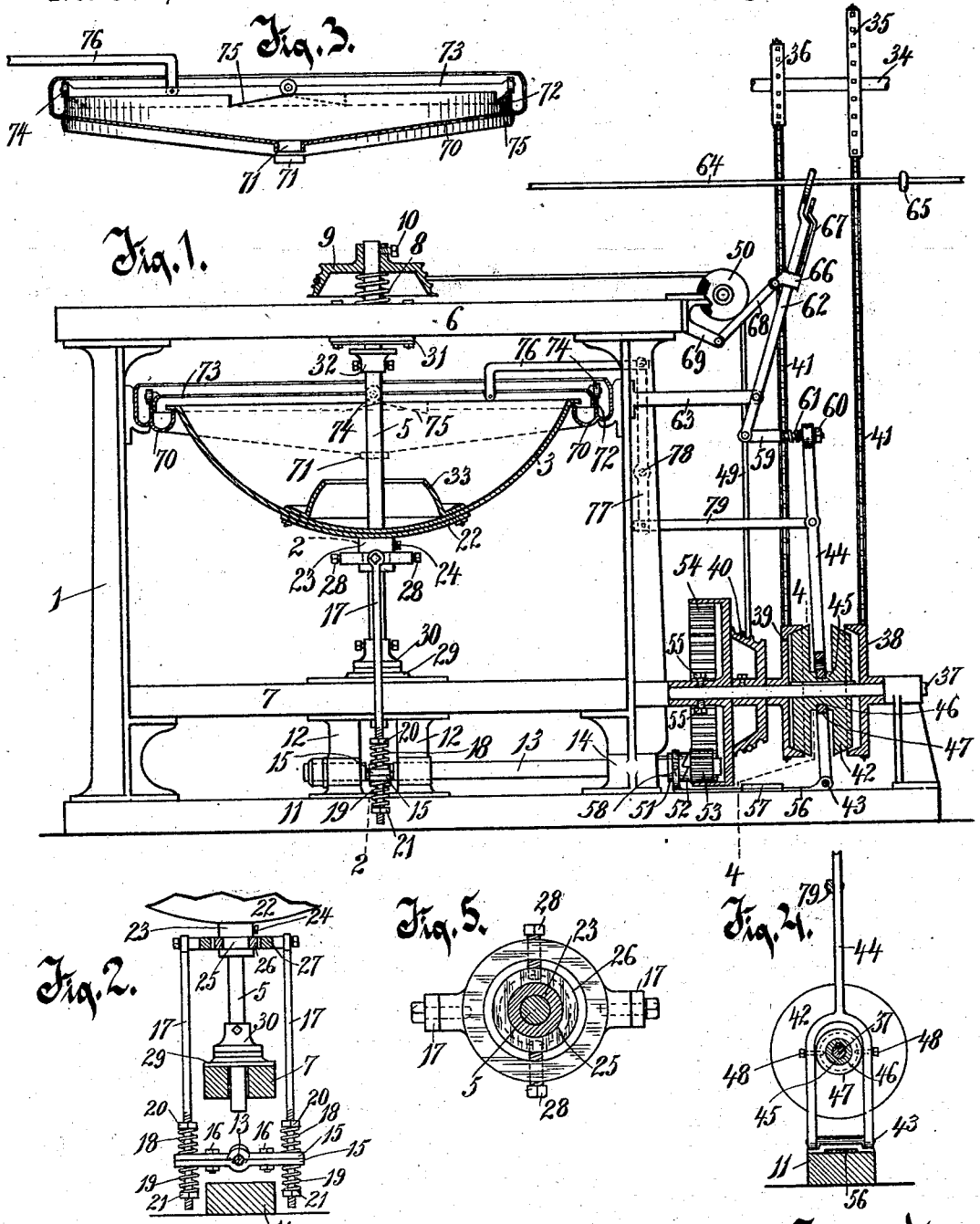
Witnesses.
Fred S. Hunt
Anna V. Faust
Inventor.
Charles E. Seymour
By
Benedict and Morsell
Attorneys.

(No Model.)  2 Sheets—Sheet 2.
C. E. SEYMOUR.
ORE CONCENTRATOR.
No. 503,687. Patented Aug. 22, 1893.
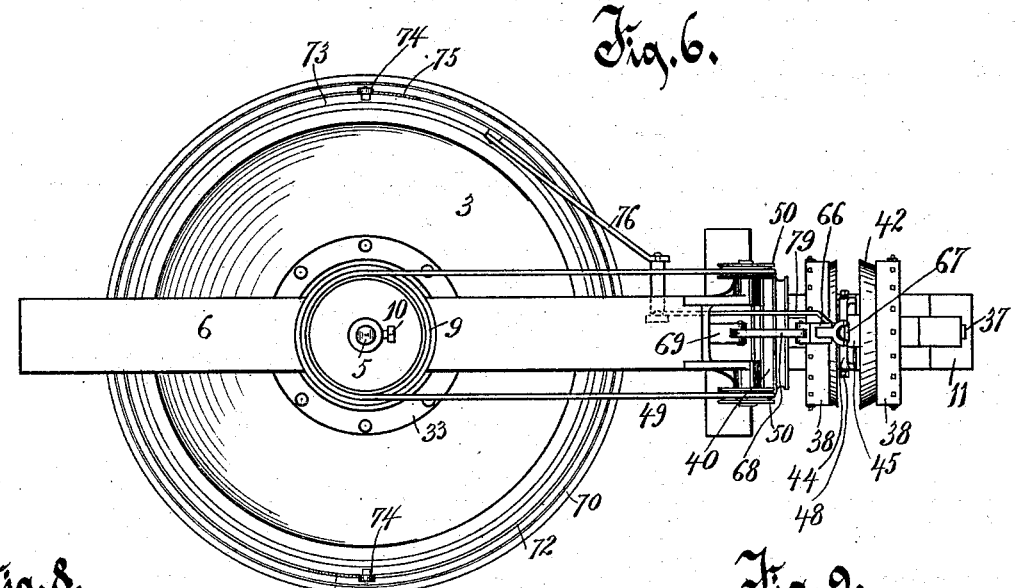
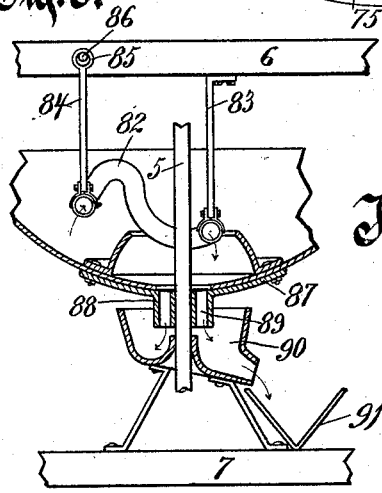
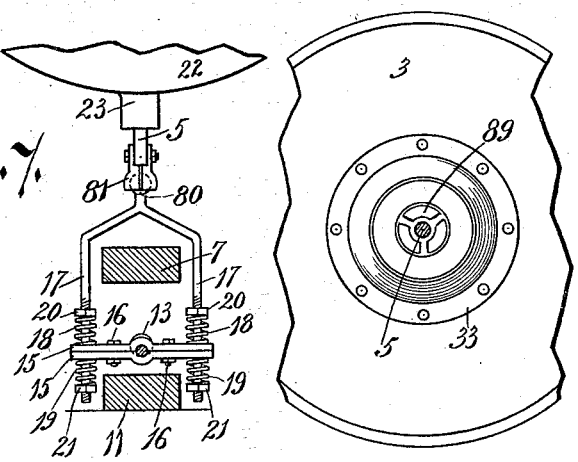
Witnesses.
Fred S. Hunt
Anna C. Faust
Inventor.
Charles E. Seymour,
By Benedict & Morsell
Attorneys.

UNITED STATES PATENT OFFICE.

CHARLES E. SEYMOUR, OF LAKE GENEVA, WISCONSIN.

ORE-CONCENTRATOR.

SPECIFICATION forming part of Letters Patent No. 503,687, dated August 22, 1893.

Application filed August 3, 1892. Serial No. 442,056. (No model.)

*To all whom it may concern:*

Be it known that I, CHARLES E. SEYMOUR, of Lake Geneva, in the county of Walworth and State of Wisconsin, have invented a new and useful Improvement in Ore-Concentrators, of which the following is a description, reference being had to the accompanying drawings, which are a part of this specification.

My invention has relation to improvements in ore concentrators, more particularly adapted for separating particles of different specific gravity when in a pulverized state.

The primary objects had in view are, first, to provide simple and efficient means for imparting to the shaft and its bowl a vertically reciprocating movement; secondly, to provide for keeping the ore or material from packing solidly in the bottom and along the inner wall of the pan thereby keeping the contents free to act under centrifugal force and the force of gravity; and, thirdly, to provide for discharging into one receptacle, by centrifugal force, the waste or lighter material, during the period of concentration or slow speed, and for discharging into another receptacle or trough, the concentrates or heavier parts which are collected in the pan during the period of concentration under the increased velocity of the pan. The accomplishment of the first-named object comprehends the employment of a crank shaft connected to the bowl-supporting mechanism, so that by the revolution of the crank-shaft the pan is given a reciprocating or endwise motion while it is being revolved. The accomplishment of the second object comprehends the employment, in connection with the above mentioned mechanism, of certain means adapted to contact with bumping plates at the end of either stroke, and, finally, the accomplishment of the other object comprehends the employment of a double circular trough having a movable ring therein adapted to be raised or lowered above and below the flange of the bowl.

In the accompanying drawings, Figure 1, is a side elevation of the complete machine, parts being in section for the purpose of clearer illustration. Fig. 2, is a section on the line 2—2 Fig. 1. Fig. 3, is a vertical section through the double annular trough. Fig. 4, is a vertical section on the line 4—4 Fig. 1. Fig. 5, is a plan view of the trunnion connection for the connecting rods. Fig. 6, is a plan view of Fig. 1. Fig. 7, illustrates a modification in the arrangement of the connecting rods shown in Fig. 2. Fig. 8, is a sectional view of a fragment of the pan illustrating a preferred form of scoop, also a trough below the pan and a second trough to receive the concentrates therefrom; and Fig. 9, is a plan view of Fig. 8, omitting the scoop.

Like numerals of reference designate like parts throughout the several views.

Referring to the drawings, the numeral 1 indicates a frame of suitable construction for supporting the operative mechanism. A concentrator pan or bowl, 3, is supported on a central piercing shaft 5, the opposite extremities of said shaft having bearings in transverse beams 6 and 7 respectively. The upper end of this shaft is supported yieldingly and balanced by a coiled spring, 8, confined between the beam, 6, and the under face of a hollow cone pulley, 9, upon the shaft. This cone pulley is secured to the shaft by means of a set screw 10, whereby the tension of the spring may be adjusted.

Arranged between the beam 7, and the lower beam 11, are brackets 12, 12, said brackets having journal boxes cast therein through which a crank shaft 13, passes, said crank shaft also passing through a journal box 14, in one of the upright columns of the frame. The cranked portion of the shaft has its bearing between two cross-heads 15, 15, said crossheads provided with registering semicircular recesses and held together by means of bolts 16, 16. Passing through the opposite ends of the cross heads are vertical rods 17, 17, upon each of which are arranged two springs 18, 18 and 19, 19, the former confined between the upper cross head and nuts 20, 20, upon the respective rods, and the latter between the lower cross head and nuts 21, 21. These nuts, as will be readily seen, form a convenient means for adjusting the tension of the springs.

Secured to the bottom of the pan or bowl is a cup-shaped plate 22, from which depends centrally a collar 23, surrounding the shaft and held adjustably thereto by means of a set screw 24. This collar is provided with an annular recess 25, in which a ring or annulus 26, fits. This latter ring in turn is surrounded by an outer trunnion ring 27, pivoted thereto upon screws or trunnions 28, 28, as clearly shown in Fig. 5, thus forming a trunnion connection for the upper ends of the rods, whereby the cross heads are permitted to have a swinging movement.

Resting upon the top of beam 7 is a leather cushioned plate, 29, and normally bearing upon this is a bumping head 30, adjustably set upon the shaft so that it will come in contact with the cushion before the crank is down the full length of its stroke, thereby causing the jar necessary to produce a good separation. Secured to the under side of beam 6, is a similar cushioned plate 31, and located upon the shaft a slight distance from this cushion is a second bumping head 32, adjustably set thereon so as to contact with the cushion before the crank has completed its full up stroke.

Secured to the bottom of the interior of the pan is a cup 33, of approximately truncated-conical form the upper end thereof being open.

The numeral 34 indicates a fragment of a main driving shaft, driven from any suitable source of power and having mounted thereon large and small sprocket wheels 35 and 36 respectively. Some distance below the driving shaft is a countershaft 37, having loosely mounted thereon two sprockets 38 and 39, and also carrying toward its inner end a cone pulley 40. These sprockets 38 and 39 are connected, respectively, with sprockets 35 and 36, by sprocket chains 41, 41. I prefer to run the machine with chains and sprocket wheels rather than with belts and pulleys, in order to obtain a more positive power. The inner surfaces of sprockets 38 and 39 are beveled inwardly as clearly shown in the drawings. Feathered or splined on the shaft, intermediate the two sprocket wheels is a double friction clutch 42, having two disks, the peripheries of which being beveled to enter the sprockets 38 and 39 and to register with the corresponding bevels thereof. A rod or pin 43, connects the forked or bifurcated lower end of a shifting lever 44, said forked portion straddling the central connecting collar 45, of the double friction clutch, with a horizontal strap 56, hereinafter referred to. This central connecting collar is provided with an annular recess 46, which receives an annulus or ring 47. Screws 48, pass through the furcate arms of the lever and engage this ring, so that when motion is imparted to the lever the clutch will be caused to be moved longitudinally upon the countershaft. A belt 49, runs around cone pulley 40, and thence upwardly over two quartered pulleys 50, 50, mounted in the frame, and thence around cone pulley 9 at the upper end of shaft 5.

In the position shown in the drawings, the friction clutch is in engagement with sprocket 39 which derives its motion from the smaller sprocket 36 of the driving shaft, and consequently a slow rotation is imparted to the concentrator bowl and its shaft 55. When, however, the clutch is shifted so as to engage sprocket 38, which derives its motion from the large sprocket 35 of the driving shaft the speed is increased.

Feathered or splined upon crank shaft 13, near the outer end thereof is one member 51, of a clutch, the other member 52, thereof being loose upon the shaft and formed with a pinion 53, which engages an internal gear 54, fixed upon countershaft 37, preferably by set screws 55, and formed rigid with the cone pulley 40.

The lower end of the shifting lever 44 is pivoted by the pivot pin 43 to a horizontal strap 56, said strap passing through a guide loop 57, and has its end terminating in a fork 58, which engages the splined or feathered member of the clutch, preferably a groove therein, and is adapted to slide the same in and out of engagement with the loose pinion clutch. It will be noticed that the lever, 44, has in its reverse actions two distinct fulcrum points, the fulcrum point for the unclutching movement for the slide or strap 56, being the extreme left hand position of pivot screws 48, after the friction clutch, 42, has engaged sprocket wheel 38, and the other the extreme right hand position of pivot screws 48, when the clutch has engaged sprocket wheel 39. The upper end of shifting lever 44 is provided with an eye through which the reduced end of a link 59 passes. The extremity of this reduced end receives a nut 60, bearing against the outer side of the end of the lever, while interposed between the shoulder of the link and the inner side of the end of the lever is a spring 61. A trip lever 62, is pivoted to the inner end of link 59, said lever having its fulcrum in an arm 63, extending out from the frame, and also having its upper end forked for the passage therethrough of a cable 64, carrying a button 65. Sliding upon lever 62 is a collar 66, formed or provided with an upwardly-extending arm, 67, having a T-shaped upper end. This collar is pivotally connected to the frame of the machine by means of a link 68, engaging an arm 69. A double circular trough 70, each section thereof provided with a separate discharge orifice 71, 71, surrounds the pan, the dividing strip or partition thereof being indicated by the numeral 72. Within the trough is arranged an inwardly-curved ring or band, 73, provided near its upper edge with a series of rollers, 74, preferably placed equidistant apart and normally resting upon the upper edge of partition 72, and provided with deep peripheral grooves, not shown, to prevent their swaying. This edge of the partition is provided with a series of inclines 75, equal in number to the rollers employed. In order to provide for the movement of ring 73 on the circumference of the partition, 72, I connect to said ring an arm 76, to the outer end of which is connected a lever 77, fulcrumed at 78, the lower end of said lever connected with lever 44 by a link 79.

Fig. 7, of the drawings illustrates another arrangement of the vertical rods 17, 17, wherein they are shown as being joined at their upper ends and formed into a ball 80, said ball fitting in a socket piece 81, thereby forming a ball and socket connection, which, in some instances, may be preferable to the connection shown in the other figures of the drawings.

The means for imparting alternate fast and slow movements to the concentrating pan or bowl by the shifting friction clutch engaging the wheels upon opposite sides thereof, is fully described, and also claimed, in an application for Letters Patent by me for improvements in ore concentrators, the papers in which case were executed on the 18th day of June, 1892, and consequently I do not lay claim to such mechanism herein, except in so far as it co-operates with the new features embraced in the present application.

In the adjustment shown in Fig. 1 of the drawings, the machine is running at normal or slow speed, inasmuch as the double clutch is in mesh with the pulley upon the countershaft which derives its motion from the smaller of the two pulleys upon the main driving shaft. When thus running at slow speed the rollers of ring 73 are supported upon the edge of the partition, 72, of the double trough away from the inclines, 75, the ring therefore occupying its raised position. During this interval of concentration or slow period, the waste or lighter material is discharged over the top of the pan into the inner section of the trough, and conducted out of the same through the discharge orifice, the raised ring with its rounded form, serving to prevent the gangue or tailings from being thrown outwardly above the inner section and into the outer trough. The moment button 65 upon the cable strikes the forked end of lever 62, the friction clutch is thrown to the right so as to engage with the outer sprocket upon the countershaft deriving its motion from the large pulley of the driving shaft. It is obvious that with this movement the speed is at once increased. As it is desirable that the clutch should be kept in this position for a certain length of time, sufficiently long to allow the fast speed to subserve its function, I provide the interposed spring 61, above referred to, which as the button upon the cable continues to press against lever 62 and carry its upper end toward the left will force the reduced end of link 59 through the eye of lever 44, and compress the spring. As tripping lever 62 is moved toward the left, the collar 66 slides on the lever, and is so adjusted and arranged that the T-head of its integral arm will strike the cable at the proper time and elevate the same, releasing the button from engagement with lever 62, thus permitting said lever and other parts to resume their normal positions, the clutch at the same time being shifted back to cause the same to engage the slow pulley of the countershaft. The shifting back of the clutch to engage the slow pulley is accomplished by the action of the collar 66 upon lever 62, said collar of course tending to return to its normal lower position when the lever is released by the button. Before the above parts resume their normal positions, however, other actions take place by reason of the actuation of the tripping lever by the button upon the cable, the first to be described being that upon the ring or band, 73, of the double trough, by means of the connections 73, 77, and 79. It is of course evident that as the tripping lever is engaged by the button, as above described, shifting lever 44, through the connecting link 79, turns lever 77 upon its fulcrum point, and causes the inner end of arm 76 to move toward the left of Fig. 1, thereby forcing the rollers of ring 73 to roll down the inclines 75, and thus lowering the ring automatically to approximately a level with the dividing strip or partition 72. It will be noticed that simultaneously with the lowering of the ring, the lever 44 also acts upon the double clutch in order to shift the same into engagement with the sprocket giving fast speed. The result is that the increased speed accelerates the centrifugal force, and acting upon the concentrates or heavier particles which are collected in the pan during the period of concentration, throws the same over into the outside trough, the ring in its lower position offering no obstruction thereto. From this outer trough the heavier material passes through the discharge orifice thereof, and is conducted into an ordinary settler, not shown. The movement of shifting lever 44 toward the right also forces the strap 56, thereof toward the left, the splined member 51, of the clutch being thus slid out of mesh with the other member of the clutch and against the upright column of the frame, in which position, the pinion-clutch engaged by the internal gear 54, is idle and does not transmit motion to the crank shaft. Upon the return of the double friction clutch to its engagement with the sprocket giving slow speed, upon the release of the tripping lever, as illustrated in Fig. 1, strap 56 slides the splined member of the clutch into engagement with the pinion clutch, thus causing the crank shaft to rotate in unison with the countershaft. As this occurs, the crank of the shaft will act upon the cross heads, causing the vertical rods 17, 17, to move in a vertical path, and impart to the pan a like vertical movement, the bumping heads upon the shaft also providing for a quick bumping action near the end of either stroke. The bumping heads, thus coming in contact before the crank has quite completed its movement, it is made necessary to provide a means for a slight movement of the cross heads independent of the connecting bars, which necessarily are compelled to remain stationary the moment the bumping heads come in contact with the bumping plates. It is for this reason that the vertical rods pass loosely through apertures in the cross heads, so as to allow the further actuation of the crank shaft to move said cross heads upon the rods, the spring bearing upon the opposite sides of the cross heads keeping the same taut upon either movement. It will also be noticed that the method of connecting the upper ends of the vertical rods 17, 17, forms a toggle-joint which provides for the swing of the cross heads. The vertical movement of the pan and the quick knocks near the end of either stroke prevent the ore or material from packing solidly in the bottom and along the inner wall of the pan and thereby keeping the contents of the pan free to act under centrifugal force and the force of gravity, producing a separation of the heavier particles from the lighter, the lighter being carried off during this slow period over the top of the pan, and the heavier being retained until sufficient amount is collected to require discharge, at which time the pan is automatically rotated at a faster rate of speed as previously explained, while the vertical and knocking actions of the pan cease and the heavier particles are likewise discharged into their appropriate receptacles. The cup 33, within the pan is for the purpose of stopping off the center thereof and also forming an open chamber into which the concentrates may be discharged by a hand scoop or conductor, or, if desired, automatically as described in my application for Letters Patent for improvements in ore concentrators, filed September 19, 1891, Serial No. 406,183, and allowed February 26, 1892.

In Figs. 8 and 9, I have shown the preferred means for discharging the concentrates. In Fig. 8, the numeral 82 indicates a flexible conductor suspended by a hanger, 83, at its discharge end fixed solid to the frame and by a handle, 84, at its scoop end, said handle provided at its upper end with a loop 85, adapted to be hung on a pin, 86. Secured to the bottom of the bowl is a plate, 87, provided with a depending portion 88, through the center of which the shaft passes, the shaft opening being surrounded by a series of ports, 89, through which the concentrates pass. A circular trough 90, surrounds the shaft, below depending portion 88, and under the ports and is adapted to catch the concentrates within the bowl which may be discharged through the conductor 82, into the cup 33, and through the ports 89. From the trough 90 the concentrates are conducted to a second trough or launder 91. This operation of discharging can be performed without stopping the machine by taking down the handle and carrying the scoop up the side of the pan, when there is sufficient amount of concentrates in the pan to warrant their discharge.

In the form shown in Figs. 8 and 9 either the rod connection shown in Fig. 2, or the ball and socket joint employed in Fig. 7, may be employed. In either case, however, the trough 90 is arranged above said connection.

Having thus described my invention, what I claim, and desire to secure by Letters Patent, is—

1. In an ore concentrator, the combination, of a revoluble shaft, a concentrator bowl fixed thereon, a double trough around the outside of the bowl, a ring or band, and means for automatically raising and lowering said ring above and below the top of the bowl, substantially as set forth.

2. In an ore concentrator, the combination of an ore receiving pan, mechanism for revolving the same at a slow rate of speed and then temporarily increasing said rate of speed, a double trough around the outside of the bowl, and a ring or band adapted to be raised above the top of the bowl when the same is revolved at a slow rate of speed, and to be lowered when said pan is revolved at a fast rate of speed, substantially as set forth.

3. In an ore concentrator, the combination, of a rotatable shaft, a concentrator bowl fixed thereon, a double trough around the outside of the bowl, the partition thereof provided with a series of declines, a ring or band provided with a series of rollers adapted to rest upon the edge of the partition, and means for actuating the ring whereby the rollers are made to descend and ascend the declines, substantially as set forth.

4. In an ore concentrator, the combination of a pan supported on a rotatable shaft, bowl supporting mechanism, and a crank shaft connected to the bowl supporting mechanism and constructed to give to the pan a reciprocating or endwise motion, substantially as set forth.

5. In an ore concentrator, the combination, of a pan supported on a rotatable shaft, bowl supporting mechanism, a crank shaft connected to the bowl supporting mechanism and constructed to give to the pan a reciprocating or endwise motion, a clutch splined upon the crank shaft, a motion clutch loose thereon, and means for throwing said clutches into and out of engagement, substantially as set forth.

6. In an ore-concentrator, the combination, of a pan supported on a rotatable shaft, means for jumping the shaft up and down, and a bumping head independent from the jumping mechanism, said bumping head carried by the shaft and constructed, when said shaft is moved vertically by the jumping mechanism, to act against the frame of the machine, whereby a vertical jar or bump is imparted to the bowl and its contents, substantially as set forth.

7. In an ore concentrator, the combination, of an ore receiving pan, mechanism for revolving the same at a slow rate of speed and then temporarily increasing said rate of speed, bowl supporting mechanism, and a crank shaft connected to the bowl supporting mechanism and constructed to act thereon to give the pan or bowl a reciprocating or endwise motion when said pan is revolved at a slow rate of speed, substantially as set forth.

8. In an ore concentrator, the combination, of an ore receiving pan, mechanism for revolving the same at a slow rate of speed and then temporarily increasing said rate of speed, a double trough around the outside of the bowl, a ring or band adapted to be raised above the top of the bowl when the same is revolved at a slow rate of speed and to be lowered when said bowl is revolved at a fast rate of speed, bowl supporting mechanism, a crank shaft connected to the bowl supporting mechanism, and means for actuating the same when the pan or bowl is running at slow speed to give to said pan a reciprocating or endwise motion, substantially as set forth.

9. In an ore concentrator, the combination, of a concentrating pan or bowl supported on a rotatable shaft, said bowl provided with a depending collar through which the shaft passes, said collar formed exteriorly with an annular recess, a ring fitted in said recess, a ring or annulus surrounding the first named ring and pivoted thereto, vertical rods connected to the outer ring, a cross head carried near the ends of said rods, and a crank shaft passing through the cross head and constructed by its rotation to raise and lower bowl through the connecting rods, substantially as set forth.

10. In an ore concentrator, the combination, of a concentrating pan or bowl supported on a rotatable shaft, rods connected with the pan or bowl, a cross head located near the ends of the rods, springs on the rods above and below the cross head, nuts for adjusting the tension of the springs, and a crank shaft passing through the cross head and constructed by its rotation to raise and lower the bowl through the connecting rods, substantially as set forth.

11. In an ore concentrator, the combination, of a concentrator pan or bowl, a shaft carrying said bowl and provided with a pulley, bowl supporting mechanism, a crank shaft connected to the bowl supporting mechanism, said crank shaft carrying a feathered clutch and a loose pinion clutch, a second shaft, fast and slow wheels loose upon said shaft, a double friction clutch feathered upon the shaft, a lever engaging said clutch and constructed to throw the same into contact with either of the loose wheels, said lever provided with an extension engaging the feathered clutch upon the crank shaft, a pulley also mounted upon the second shaft and having rigid therewith an internal gearing engaged by the pinion clutch, and a belt connecting the pulley with the pulley upon the bowl shaft, substantially as set forth.

12. In an ore concentrator, the combination, of a concentrator pan or bowl, a shaft carrying said pan or bowl having mounted thereon a hollow pulley wheel for conveying the motion thereto, and a spring encircling the shaft, confined between the under face of the hollow wheel and a fixed support, substantially as set forth.

13. In an ore concentrator, the combination of a rotatable pan or bowl provided with an aperture through the bottom thereof for the passage of the bowl shaft, and also with apertures concentric to the shaft aperture, a cup rigid with the bowl and surrounding the shaft and several apertures, a scoop constructed to discharge into the cup through the opening thereof, and troughs or launders beneath the pan or bowl and in line with the apertures to receive the discharge therefrom, substantially as set forth.

14. In an ore concentrator, the combination, of a pan supported on a rotatable shaft, means for jumping the shaft up and down, and bumping heads, independent from the jumping mechanism, said bumping heads carried at different points of the shaft and adapted to come in forcible contact with fixed portions of the frame upon the up and down movements, respectively, of the shaft, substantially as set forth.

In testimony whereof I affix my signature in presence of two witnesses.

CHARLES E. SEYMOUR.

Witnesses:
    Jos. B. Brien,
    Wm. Sims.